(12) United States Patent
Lee et al.

(10) Patent No.: US 11,056,690 B2
(45) Date of Patent: Jul. 6, 2021

(54) RECHARGEABLE LITHIUM BATTERY

(71) Applicant: SAMSUNG SDI CO., LTD., Yongin-si (KR)

(72) Inventors: Junkyu Lee, Yongin-si (KR); Bokhyun Ka, Yongin-si (KR); Na-Ri Seo, Yongin-si (KR); Kyeuyoon Sheem, Yongin-si (KR); Jinhyon Lee, Yongin-si (KR); Eun-Hyung Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/800,297

(22) Filed: Nov. 1, 2017

(65) Prior Publication Data
US 2018/0123131 A1    May 3, 2018

(30) Foreign Application Priority Data
Nov. 2, 2016    (KR) .......................... 10-2016-0145321

(51) Int. Cl.
*H01M 4/583* (2010.01)
*H01M 10/0525* (2010.01)
(Continued)

(52) U.S. Cl.
CPC ........... *H01M 4/583* (2013.01); *H01M 4/587* (2013.01); *H01M 4/62* (2013.01); *H01M 10/052* (2013.01);
(Continued)

(58) Field of Classification Search
CPC .................................................... H01M 4/583
See application file for complete search history.

(56) References Cited

U.S. PATENT DOCUMENTS 8,801,960 B2 * 8/2014 Ueda .................. C01G 45/1228
252/182.1
10,320,030 B2 * 6/2019 Takiguchi ......... H01M 10/0567
(Continued)

FOREIGN PATENT DOCUMENTS

| CN | 101341091 A | 1/2009 |
| CN | 102341346 A | 2/2012 |

(Continued)

OTHER PUBLICATIONS

Office Action dated Feb. 28, 2019 in co-pending U.S. Appl. No. 15/799,238.
(Continued)

*Primary Examiner* — Ula C Ruddock
*Assistant Examiner* — Thomas H. Parsons
(74) *Attorney, Agent, or Firm* — Lee IP Law, PC

(57) ABSTRACT

A rechargeable lithium battery includes an electrolyte, a negative electrode, and a positive electrode. The negative electrode includes a negative active material layer on a negative current collector, and includes a carbon-based negative active material. The negative electrode having a Degree of Divergence (DD) value of about 19 to about 60. The positive electrode includes a positive active material layer and a positive current collector, and includes a positive active material and a porous structured additive. The content of the porous structured additive is about 0.01 wt % to about 2 wt % based on 100 wt % of the positive active material layer.

17 Claims, 9 Drawing Sheets

(51) Int. Cl.
*H01M 4/587* (2010.01)
*H01M 4/62* (2006.01)
*H01M 10/052* (2010.01)
*H01M 4/02* (2006.01)

(52) U.S. Cl.
CPC ........ *H01M 10/0525* (2013.01); *H01M 4/625* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2001/0016286 | A1 | 8/2001 | Senoo et al. |
| 2002/0086211 | A1 | 7/2002 | Umeno et al. |
| 2002/0119371 | A1 | 8/2002 | Haug |
| 2004/0072076 | A1 | 4/2004 | Matsubara et al. |
| 2006/0024579 | A1 | 2/2006 | Kolosnitsyn et al. |
| 2007/0128518 | A1 | 6/2007 | Uono et al. |
| 2008/0199777 | A1* | 8/2008 | Onishi ............ H01M 4/0404 429/231.8 |
| 2008/0318133 | A1 | 12/2008 | Matsuyama et al. |
| 2009/0202917 | A1 | 8/2009 | Sotowa et al. |
| 2009/0214954 | A1 | 8/2009 | Onishi et al. |
| 2012/0021294 | A1 | 1/2012 | Zhamu |
| 2012/0164530 | A1* | 6/2012 | Temmyo ............ H01M 4/485 429/211 |
| 2012/0196193 | A1 | 8/2012 | Sotowa et al. |
| 2013/0143125 | A1 | 6/2013 | Tsujiko et al. |
| 2013/0177792 | A1 | 7/2013 | Takahata et al. |
| 2014/0065478 | A1 | 3/2014 | Mitsuhashi et al. |
| 2014/0072877 | A1 | 3/2014 | Araki et al. |
| 2014/0134486 | A1 | 5/2014 | Uchida et al. |
| 2014/0166939 | A1 | 6/2014 | Park |
| 2014/0227588 | A1 | 8/2014 | Kim et al. |
| 2015/0010818 | A1 | 1/2015 | An et al. |
| 2015/0030931 | A1* | 1/2015 | Takahata ............ H01M 4/133 429/231.8 |
| 2016/0268608 | A1 | 9/2016 | Nishimura et al. |
| 2018/0123120 | A1 | 5/2018 | Lee et al. |
| 2018/0123131 | A1 | 5/2018 | Lee et al. |
| 2018/0175391 | A1 | 6/2018 | Komura et al. |

FOREIGN PATENT DOCUMENTS

| | | | |
|---|---|---|---|
| CN | 103988344 A | | 8/2014 |
| EP | 1032068 A2 | | 8/2000 |
| EP | 2 538 484 A1 | | 12/2012 |
| EP | 2 660 903 A1 | | 11/2013 |
| EP | 2666903 | * | 11/2013 |
| EP | 2709193 | * | 6/2015 |
| JP | 3705801 B1 | | 8/2005 |
| JP | 4150516 B2 | | 9/2008 |
| JP | 2012-033375 A | | 2/2012 |
| JP | 2013-004307 A | | 1/2013 |
| JP | 2013-069432 A | | 4/2013 |
| JP | 2014-029833 A | | 2/2014 |
| JP | 2014-086258 A | | 5/2014 |
| JP | 2014-096386 A | | 5/2014 |
| JP | 5556755 B2 | | 7/2014 |
| JP | 5652682 B2 | | 1/2015 |
| JP | 2015-138644 A | | 7/2015 |
| JP | 2016-131123 A | | 7/2016 |
| JP | 2017-063013 A | | 3/2017 |
| JP | 2017-063040 A | | 3/2017 |
| KR | 10-2007-0046126 A | | 5/2007 |
| KR | 10-0912788 B1 | | 8/2009 |
| KR | 10-0954306 B1 | | 4/2010 |
| KR | 10-1014969 B1 | | 2/2011 |
| KR | 10-1106966 B1 | | 1/2012 |
| KR | 10-1195081 B1 | | 10/2012 |
| KR | 10-2013-0060268 A | | 6/2013 |
| KR | 10-2014-0035256 A | | 3/2014 |
| KR | 10-1582718 B1 | | 12/2015 |
| KR | 10-1599322 B1 | | 2/2016 |
| KR | 10-2017-0002302 A | | 1/2017 |
| WO | WO 2013/108516 A1 | | 7/2013 |
| WO | WO 2018/012821 A1 | | 1/2018 |

OTHER PUBLICATIONS

USPTO Office action dated Aug. 20, 2019, in U.S. Appl. No. 15/799,238.
Juliette Billaud, et al., "Magnetically aligned graphite electrodes for high-rate performance Li-ion batteries", Nature Energy, vol. 1, No. 8, Jul. 4, 2016 (Jul. 4, 2016), pp. 1-6.
EESR issued Sep. 6, 2019 for EP 19171112.6 which corresponds with co-pending U.S. Appl. No. 16/394,077.
EESR issued Sep. 30, 2019 for EP 19169561.8 which corresponds with co-pending U.S. Appl. No. 16/382,331.
USPTO Notice of Allowance dated Nov. 21, 2020, in U.S. Appl. No. 15/799,238.
Chinese Office Action and Search Report dated Jun. 28, 2020 and dated Jun. 9, 2020.
Korean Office action dated Dec. 3, 2020.
U.S. Office action received in co pending U.S. Appl. No. 16/394,077 dated Mar. 4, 2021.
Chinese Office action dated Mar. 16, 2021.
U.S. Office action received in co pending related U.S. Appl. No. 16/382,331 dated Apr. 14, 2021.

* cited by examiner

RECHARGEABLE LITHIUM BATTERY

CROSS-REFERENCE TO RELATED APPLICATION

Korean Patent Application No. 10-2016-0145321 filed on Nov. 2, 2016, and entitled, "Rechargeable Lithium Battery," is incorporated by reference herein in its entirety.

BACKGROUND

1. Field

One or more embodiments herein relate to a rechargeable lithium battery.

2. Description of the Related Art

Rechargeable lithium batteries are used to power many types of electronic devices. These batteries use an organic electrolyte solution and therefore have greater discharge voltage and energy density than batteries that use an alkali aqueous solution. The positive active material for a rechargeable lithium battery may be a lithium-transition metal oxide capable of intercalating lithium ions. Examples include $LiCoO_2$, $LiMn_2O_4$, $LiNi_{1-x}Co_xO_2$ (0<x<1). The negative active material for a rechargeable lithium battery may be artificial graphite, natural graphite, or hard carbon.

SUMMARY

In accordance with one or more embodiments, a rechargeable lithium battery includes an electrolyte; a negative electrode including a negative active material layer on a negative current collector and including a carbon-based negative active material, the negative electrode having a Degree of Divergence (DD) value of about 19 to about 60, the DD value defined by the following equation:

$$DD=(I_a/I_{total})*100$$

where $I_a$ is a sum of peak intensities at non-planar angles measured by XRD using a CuKα ray and $I_{total}$ is a sum of peak intensities at all angles measured by XRD using a CuKα ray; and a positive electrode including a positive active material layer on a positive current collector and including a positive active material and a porous structured additive, wherein a content of the porous structured additive is about 0.01 wt % to about 2 wt % based on 100 wt % of the positive active material layer.

The content of the porous structured additive may be about 0.01 wt % to about 0.5 wt % based on 100 wt % of the positive active material layer. The porous structured additive may be a carbon-based porous material, an oxide-based porous material, a carbon-coatedoxide-based porous material, or a combination thereof. The porous structured additive may be activated carbon, porous anodized aluminum oxide, or a combination thereof.

The DD value of the negative electrode may be about 19 to about 40. The $I_a$ may be a sum of peak intensities at 2θ=42.4±0.2°, 43.4±0.2°, 44.6±0.2°, and 77.5±0.2° measured by XRD using a CuKα ray, and the $I_{total}$ may be a sum of peak intensities at 2θ=26.5±0.2°, 42.4±0.2°, 43.4±0.2°, 44.6±0.2°, 54.7±0.2°, and 77.5±0.2° measured by XRD using a CuKα ray. The peak intensities may be a peak integral area value. The carbon-based negative active material may be artificial graphite or a mixture of artificial graphite and natural graphite. The negative active material layer may include a Si-based negative active material, a Sn-based negative active material, a lithium vanadium oxide, or a combination thereof. A BET specific surface area of the positive electrode may be greater than about 0.70 $m^2/g$.

In accordance with one or more other embodiments, a rechargeable lithium battery includes an electrolyte; a negative electrode including a negative active material layer on a negative current collector and including a carbon-based negative active material, wherein the negative electrode has a Degree of Divergence (DD) value of about 19 to about 60, the DD value defined by the following equation:

$$DD \text{ value}=(I_a/I_{total})*100$$

where $I_a$ is a sum of peak intensities at non-planar angles measured by XRD using a CuKα ray and $I_{total}$ is a sum of peak intensities at all angles measured by XRD using a CuKα ray; and a positive electrode including a positive current collector and a positive active material layer including a positive active material, a porous layer between the positive current collector and the positive active material layer and including a porous structured additive. A thickness of the porous layer may range from about 0.5 μm to about 10 μm.

The porous structured additive may be a carbon-based porous material, an oxide-based porous material, a carbon-coated oxide-based porous material, or a combination thereof. The porous structured additive may be activated carbon, porous anodized aluminum oxide, or combination thereof.

The DD value of the negative electrode may be about 19 to about 40. The $I_a$ may be a sum of peak intensities at 2θ=42.4±0.2°, 43.4±0.2°, 44.6±0.2°, and 77.5±0.2° measured by XRD using a CuKα ray, and the $I_{total}$ may be a sum of peak intensities at 2θ=26.5±0.2°, 42.4±0.2°, 43.4±0.2°, 44.6±0.2°, 54.7±0.2°, and 77.5±0.2° measured by XRD using a CuKα ray. The peak intensities may be a peak integral area value. The carbon-based negative active material may be artificial graphite or a mixture of artificial graphite and natural graphite. The negative active material layer may include a Si-based negative active material, a Sn-based negative active material, a lithium vanadium oxide, or a combination thereof. A BET specific surface area of the positive electrode may be greater than or equal to about 0.70 $m^2/g$.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
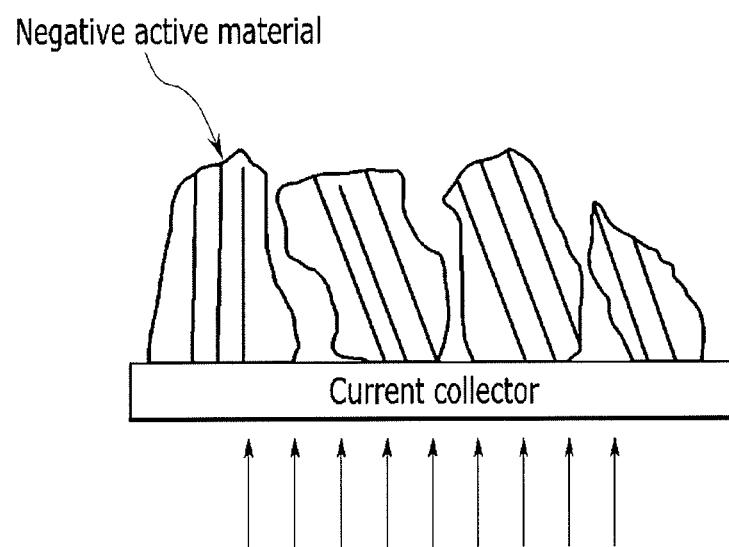
FIG. 1 illustrates an embodiment of a negative active material.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

According to one or more embodiments, a rechargeable lithium battery has a negative electrode which includes a negative current collector and a carbon-based negative active material layer. The negative active material layer may be on the negative current collector. The negative electrode may have a Degree of Divergence (DD) value defined by Equation 1 of about 19 to about 60. The rechargeable lithium battery also has a positive electrode which includes a positive active material and a porous structured additive, and an electrolyte.

$$DD\text{(Degree of Divergence)} = (I_a/I_{total}) * 100 \quad (1)$$

where $I_a$ is a sum of peak intensities at non-planar angles measured by XRD using a CuKα ray, and $I_{total}$ is a sum of peak intensities at all angles measured by XRD using a CuKα ray.

The non-planar angles may be, for example, 2θ=42.4±0.2°, 43.4±0.2°, 44.6±0.2°, and 77.5±0.2° when measured by XRD using a CuKα ray, that is, a (100) plane, a (101)R plane, a (101)H plane, and a (110) plane. Graphite may have a rhombohedral structure or a hexagonal structure with an ABAB type stacking sequence according to the stacking order of graphene layers. The R plane corresponds to the rhombohedral structure, and the H plane corresponds to the hexagonal structure.

In addition, the all angles mentioned above may be, for example, 2θ=26.5±0.2°, 42.4±0.2°, 43.4±0.2°, 44.6±0.2°, 54.7±0.2°, and 77.5±0.2° when measured by XRD using a CuKα ray, that is, a (002) plane, a (100) plane, a (101)R plane, a (101)H plane, a (004) plane, and a (110) plane. A peak at 2θ=43.4±0.2° may appear by overlapping a peak of a (101)R plane of a carbon-based material with another peak of a (111) plane of a current collector, for example, Cu.

Peak intensity may indicate, for example, the height of a peak or the integral area of the peak. In one embodiment, the XRD is measured under a measurement condition of 2θ=10° to 80°, a scan rate (°/S) of 0.044 to 0.089, and a step size (°/step) of 0.013 to 0.039 using a CuKα ray as a target ray, but removing a monochromator to improve a peak intensity resolution.

The DD value of the negative electrode may be about 19 to about 60, and in one embodiment about 19 to about 40. The DD value of the negative electrode may have a negative active material that is oriented at a predetermined angle and which is maintained after charging and discharging operations. In an embodiment, the degree of orientation degree of the negative active material may be adjusted by the DD value. The orientation of the negative active material may not indicate that a DD value of the negative electrode ranges from about 19 to about 60. The DD values of the oriented negative active material do not all have to be about 19 to about 60. In the embodiment, the degree of the orientation of the negative active material is control to have the DD value of about 19 to about 60.

In order to orient a negative active material included in a negative active material layer at a predetermined angle, a magnetic field may be applied while the negative active material composition is coated on a current collector.

For example, in order to manufacture a negative electrode having a DD value of about 19 to about 60, and specifically about 19 to about 40 according to an embodiment, the strength of a magnetic field, the exposure time to the magnetic field, and/or the viscosity of a negative active material composition may be adjusted.

According to one embodiment, a process for manufacturing the negative electrode may include disposing a current collector on or beneath a magnet and coating a negative active material composition including a negative active material on a current collector, as shown, for example, in FIG. 1.

The magnet may have a magnetic field with a strength in the range of 1,000 Gauss to 10,000 Gauss. The negative active material composition may be coated on the current collector and maintained for 3 seconds to 9 seconds, that is, is exposed to the magnetic field for 3 seconds to 9 seconds. The negative active material composition may have a viscosity of about 2000 cps to about 4000 cps at room temperature (e.g., about 20° C. to about 25° C.). When the strength of the magnetic field, exposure time to the magnetic field, and/or viscosity respectively satisfy the above conditions, a negative electrode having a DD value of about 19 to about 60 may be formed.

When the coating process is performed while the current collector is moved, the magnetic field (magnetic flux) of the magnet may be formed vertically with the current collector. However, because the magnetic field is formed according to a coating speed (e.g., the speed of moving the current collector) at a predetermined angle as a vector function, the negative active material in the negative active material composition may stand, e.g., be oriented at the predetermined angle on the surface of the current collector.

When the DD value ranges from about 19 to about 60, the negative active material is not substantially vertically oriented with the current collector. However, even when the negative active material is vertically oriented therewith, there may be a problem such as a battery deformation and the like as charging and discharging proceed.

Also, a movement path of lithium ions in an electrode may be reduced due to such an orientation effect of a negative electrode. Thus, lithium ion conductivity may increase and reduction of a concentration overvoltage of a negative electrode may be suppressed.

In addition, when the DD value is about 19 to about 60, the negative active material is not parallel to the current collector but oriented sufficiently enough to facilitate movement of Li ions in the negative electrode. When the DD value is less than about 19 or greater than about 60, DC internal resistance may be increased, rate capabilities (and particularly a high rate capability) may remarkably deteriorate, and cycle-life characteristics may also deteriorate.

The DD value may be obtained, for example, by charging and discharging a rechargeable lithium battery including the negative electrode, disassembling the battery when completely discharged to obtain the negative electrode, and measuring XRD about the negative electrode. The charging and discharging operations may be performed two to five times at, for example, about 0.1 C to about 0.7 C.

The negative electrode may have a peak intensity ratio at a (110) plane relative to a (004) plane (e.g., $I_{(110)}/I_{(004)}$) of greater than or equal to about 0.3, or greater than or equal to about 0.3 and less than or equal to about 0.7, when XRD is measured using a CuKα ray. When the negative electrode has a $I_{(110)}/I_{(004)}$ of greater than or equal to about 0.3, DC internal resistance may not be increased, but rate capabilities (and particularly a high rate capability) may be improved. Cycle-life characteristics may also be improved. In an embodiment, since the DD value is a peak value at a non-plane relative to a peak value at all the angles and thus not linked with $I_{(110)}/I_{(004)}$, an $I_{(110)}/I_{(004)}$ of greater than or equal to about 0.3 does not mean the DD value of greater than or equal to about 19.

The carbon-based negative active material may be, for example, artificial graphite or a mixture of artificial graphite and natural graphite. When the negative active material is a crystalline carbon-based material (such as artificial graphite or a mixture of artificial and natural graphite), the crystalline carbon-based material may have more developed crystalline characteristics than an amorphous carbon-based active material. As a result, orientation characteristics of a carbon material in an electrode about an external magnetic field may be further improved. The artificial graphite or natural graphite may be, for example, amorphous, sheet-shaped, flake-shaped, spherically-shaped, fiber-shaped, or a combination thereof without a particular limit. In addition, the artificial graphite may be mixed with the natural graphite in a ratio of about 70:30 wt % to about 95:5 wt %.

The negative active material layer may further include at least one of a Si-based negative active material, a Sn-based negative active material, or a lithium vanadium oxide negative active material as a semi or metal active material. When the negative active material layer further includes the semi or metal active material (that is, the carbon-based negative active material as a first negative active material and the semi or metal active material as a second negative active material), the mixing ratio of the first and second negative active materials may be about 50:50 to about 99:1 weight ratio.

The Si-based negative active material may be Si, a Si—C composite, $SiO_x$ ($0<x<2$), a Si-Q alloy, where Q is an element selected from an alkali metal, an alkaline-earth metal, a Group 13 element, a Group 14 element, a Group 15 element, a Group 16 element, a transition metal, a rare earth element, and a combination thereof, and not Si. The Sn-based negative active material may include Sn, $SnO_2$, a Sn—R alloy, where R is an element selected from an alkali metal, an alkaline-earth metal, a Group 13 element, a Group 14 element, a Group 15 element, a Group 16 element, a transition metal, a rare earth element, and a combination thereof and not Sn. At least one of these materials may be mixed with $SiO_2$. The Q and R elements may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or any combination thereof.

In an embodiment, the positive electrode includes a positive current collector and a positive active material layer including a positive active material. The positive electrode may also include a porous structured additive. The porous structured additive may be included in the positive active material layer and in a porous layer between the positive current collector and the positive active material layer. The porous structured additive is described is described according to inclusion types as follows.

1) Porous Structured additive in the Positive Active Material Layer

According to an embodiment, a positive electrode may include a positive current collector and a positive active material layer on the positive current collector and including a positive active material and a porous structured additive.

Figure 2:
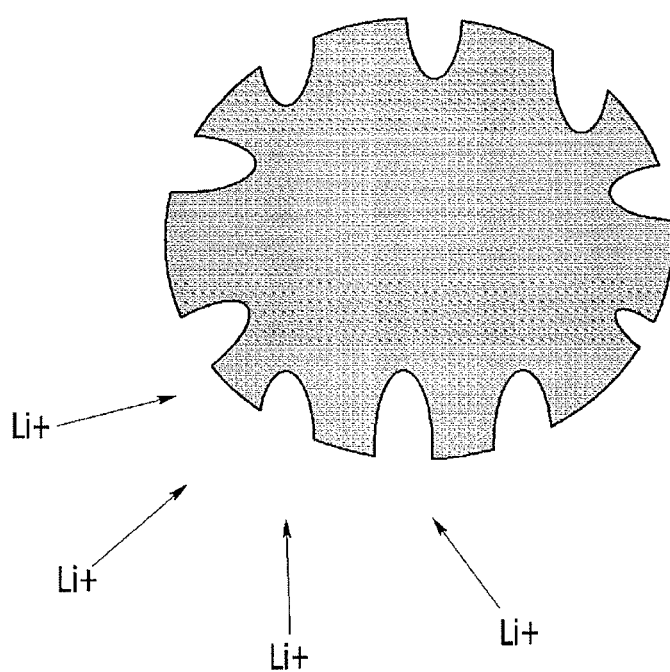
FIG. 2 illustrates an embodiment of a porous structured additive for a positive electrode.
Figure 3:
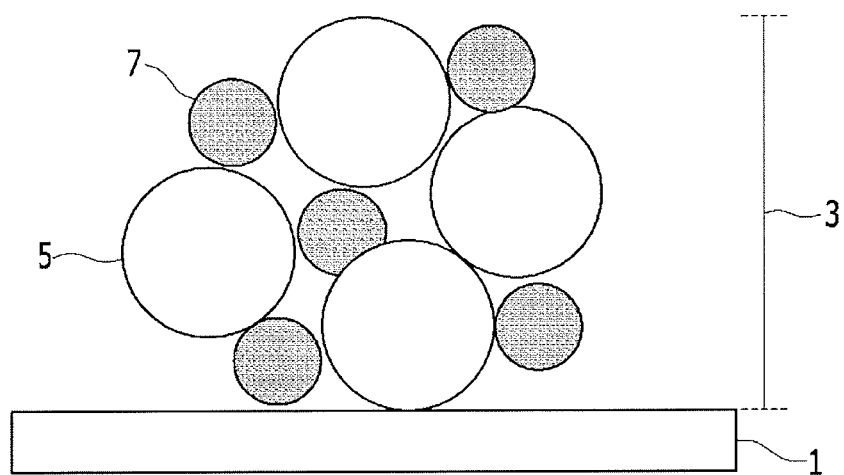
FIG. 3 illustrates an embodiment of a positive electrode structure.

FIG. 2 illustrates an example of a porous structured additive. FIG. 3 illustrates an embodiment of the structure of a positive electrode, where a positive active material layer 3 (which includes such an additive 7 with a positive active material 5) is on a current collector 1. As shown in FIG. 2, the porous structured additive makes intercalation of lithium ion easy (that is, lithium ion adsorption degree increases). Thus, the porous structured additive is mixed with the positive active material and is to be disposed in the positive active material layer in order to increase lithium ion conductivity in the positive electrode.

The content of the porous structured additive may range, for example, from about 0.01 wt % to about 2 wt %, and in one embodiment from about 0.01 wt % to about 0.5 wt % based on 100 wt %, of the positive active material layer. When the content of the porous structured additive is within one of these ranges, the concentration overvoltage of a positive electrode may be improved, overvoltage characteristics between a positive electrode and a negative electrode may be balanced, and thus ion conductivity of a rechargeable lithium battery may be improved. In addition, the structure of a positive electrode may be stabilized and, thus, a rechargeable lithium battery having improved cycle-life characteristics and energy density may be provided.

When such a porous structured additive is included in the positive electrode, an increase of an overvoltage of the positive electrode may be suppressed.

Figure 5:
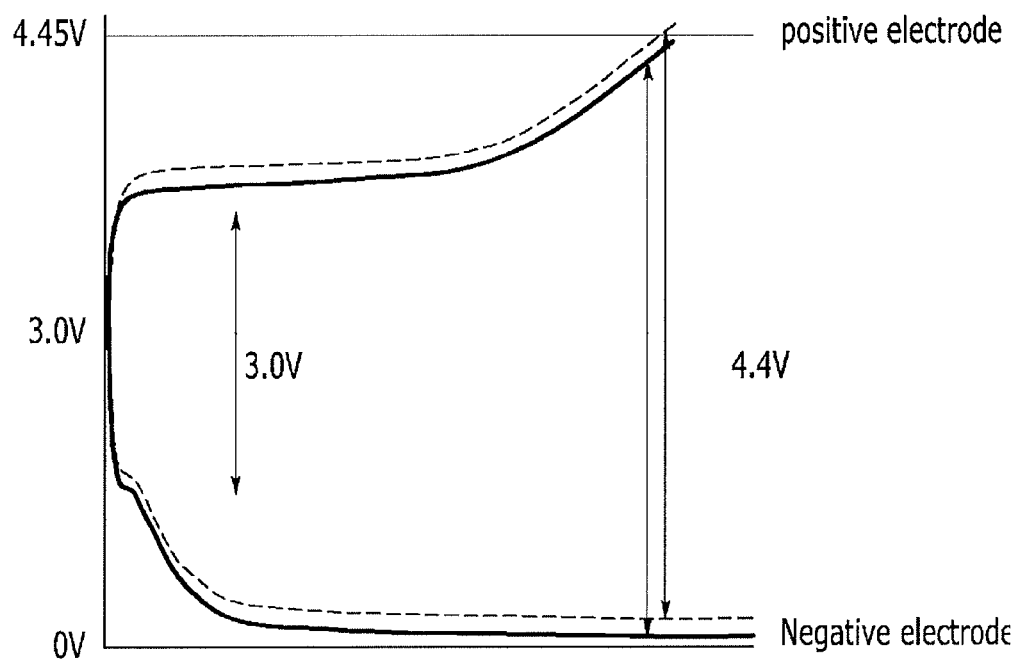
FIG. 5 illustrates an example of a potential difference between a positive electrode and a negative electrode of a rechargeable lithium battery.

A voltage of the rechargeable lithium battery may be expressed, for example, by a difference ($V_{full}$ cell=$potential_{cathode}$−$potential_{anode}$) between potentials of a positive electrode and a negative electrode. When the resistance of the negative electrode is less than that of the positive electrode, overvoltage of the negative electrode becomes less and the potential of the negative electrode drops less. As a result, the potential of the positive electrode becomes larger in order to tune the voltage of the rechargeable lithium battery voltage (e.g., dotted line graph of FIG. 5). In this way, if the potential of the positive electrode increases, then gas generation, degradation caused by oxidation of an electrolyte solution due to collapse of the positive electrode structure, and electrochemical performance of a battery may be unfavorably affected.

In an embodiment, reduction of overvoltage of the negative electrode may be suppressed using a negative electrode having a DD value of about 19 to about 60. Also, an increase of overvoltage of the positive electrode may be suppressed by adding the porous structured additive to the positive electrode (e.g., solid line graph of FIG. 5). An increase of a potential between the positive electrode and the negative electrode may also be suppressed, while maintaining the potential difference between the positive electrode and the negative electrode at about 4.4 V. Also, improved electrochemical performance of the battery may be realized.

The porous structured additive may be a carbon-based porous material, an oxide-based porous material, or a combination thereof, activated carbon, a porous anodized aluminum oxide, or a combination thereof.

A BET specific surface area of the positive electrode may be greater than or equal to about 0.70 $m^2/g$, an in one embodiment about 0.70 $m^2/g$ to about 4.7 $m^2/g$. When the BET specific surface area of the positive electrode is greater than or equal to about 0.70 $m^2/g$, reaction sites become larger, impregnation properties for lithium ions are improved, and thereby lithium ion conductivity is improved. In an embodiment, the BET may be measured by charging and discharging the lithium rechargeable battery including the positive electrode, completely discharging the battery down to less than or equal to about 3 V, disassembling the battery to obtain the positive electrode, cutting the positive electrode into a predetermined size, and putting the cut positive electrode in a BET sample holder in a nitrogen gas adsorption method.

2) Porous Structured Additive is in a Porous Layer

According to an embodiment, a positive electrode may include a positive current collector, a positive active material layer including a positive active material, and a porous layer between the positive current collector and the positive active material layer and including a porous structured additive.

Figure 4:
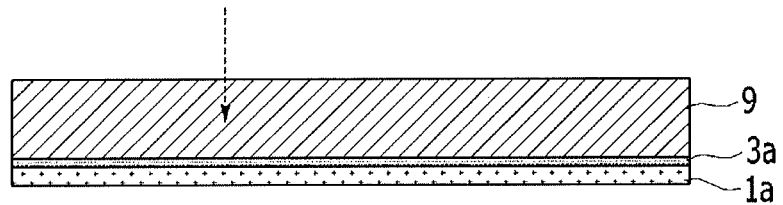
FIG. 4 illustrates another embodiment of a positive electrode structure.

FIG. 4 illustrates an embodiment of the structure of a positive electrode including a current collector 1a, a positive active material layer 3a, and a porous layer 9 between the current collector 1a and the positive active material layer 3a and including a porous structured additive.

During charging and discharging of a battery, an electrolyte is impregnated into a positive active material layer and flows from the surface of the active material layer in a depth direction, as shown in FIG. 4. When the active material layer is a thick film, effective impregnation of an electrolyte into a substrate in depth direction is somewhat difficult. In an embodiment, because the porous layer is between the current collector and the active material layer, an electrolyte may be impregnated based on pores in the porous layer. Thus, the electrolyte may easily flow into the porous layer and electrolyte impregnation characteristics may be improved.

In addition, during charging and discharging of the battery, when lithium ions are diffused inside the active material layer, the lithium ions may flow inside the active material layer. When the porous structured additive is in the porous layer, the porous structured additive may act as a capacitor. As a result, lithium ions may be adsorbed to a greater extent (e.g., lithium ion adsorption characteristics may be realized), and thus lithium ion concentration of the active material layer at the current collector may be increased and charge and discharge characteristics may be improved.

These effects may be obtained as a result of the porous structured additive in the porous layer. However, when it is formed of graphite such as graphene or carbon black, no lithium ion adsorption capability may be realized. Also, binding properties between the current collector and an active material layer may increase, but the effects of electrolyte impregnation and a lithium ion concentration may not be obtained.

The thickness of the porous layer may range, for example, from about 0.5 μm to about 10 μm, and in one embodiment from about 1 μm to about 5 μm. When the thickness of the porous layer is within the ranges, lithium ion adsorption characteristics may become desirable and internal overvoltage of a battery may be reduced. If the thickness of the porous layer is out of this range, the entire capacity of the battery may decrease or the electrochemical stability of the battery may be deteriorated by side reactions as a result of an increase of a specific surface area.

In one embodiment, the porosity of the porous layer may range from about 5% to about 50%. When the porosity of the porous layer is within this range, electrolyte impregnation properties (achieved by disposing the porous layer having such porosity between the current collector and the active material) may be increased while maintaining desirable viscosity.

The aforementioned porous structured additive may be used. The porous layer may be formed by preparing an additive liquid including the porous structured additive and a solvent, coating the additive liquid on a current collector, and drying the same. The solvent may be any solvent capable of dispersing the porous structured additive. Examples include N-methylpyrrolidone (NMP), dimethyl formamide (DMF), dimethyl acetamide (DMAC), dimethyl sulfoxide (DMSO), ethanol, or a combination thereof.

The content of the porous structured additive may range, for example, from about 50 wt % to about 95 wt % based on a total amount of the additive liquid.

The BET specific surface area of the positive electrode may be, for example, greater than or equal to about 0.70 $m^2/g$, and in one embodiment about 0.70 $m^2/g$ to about 4.7 $m^2/g$. When the BET specific surface area of the positive electrode is greater than or equal to about 0.70 $m^2/g$, reaction sites may become larger, impregnation properties for lithium ions may be improved, and thus lithium ion conductivity may be improved. In an embodiment, the BET may be measured by charging and discharging a lithium rechargeable battery including the positive electrode, completely discharging the battery down to less than or equal to about 3 V, disassembling the battery to obtain the positive electrode, cutting the positive electrode into a predetermined size, and putting the cut negative electrode in a BET sample holder in a nitrogen gas adsorption method.

Additional structures of a negative electrode and a positive electrode having the above structure will now be described.

In the negative active material layer, the negative active material may be included in an amount of about 95 wt % to about 99 wt % based on the total weight of the negative active material layer. In an embodiment, the negative active material layer includes a binder and an optional conductive material. In the negative active material layer, the content of the binder may be, for example, about 1 wt % to about 5 wt % based on the total weight of the negative active material layer. When the negative active material layer includes a conductive material, the negative active material layer may include, for example, about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. Examples of the binder include a non-water-soluble binder, a water-soluble binder, or a combination thereof. Examples of the non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be, for example, a styrene-butadiene rubber, an acrylated styrene-butadiene rubber (SBR), an acrylonitrile-butadiene rubber, an acrylic rubber, a butyl rubber, a fluorine rubber, an ethylene propylene copolymer, polyepichlorohydrin, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When a water-soluble binder is used as a negative electrode binder, a cellulose-based compound may be further used to provide viscosity as a thickener. The cellulose-based compound may be, for example, one or more of carboxylmethyl cellulose, hydroxypropylmethyl cellulose, methyl cellulose, or alkali metal salts thereof. The alkali metal may be Na, K, or Li. The thickener may be included in an amount of, for example, about 0.1 parts by weight to about 3 parts by weight based on 100 parts by weight of the negative active material.

The conductive material is included to provide electrode conductivity. Any electrically conductive material may be used as a conductive material unless it causes an adverse chemical change. Examples of the conductive material may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include, for example, a copper foil, a nickel foil, a stainless steel foil, a titanium foil, a nickel foam, a copper foam, a polymer substrate coated with a conductive metal, and a combination thereof.

According to another embodiment, a rechargeable lithium battery includes the negative electrode, a positive electrode, and an electrolyte. The positive electrode may include a positive active material layer on a positive current collector. The positive active material may include lithiated intercalation compounds that reversibly intercalate and deintercalate lithium ions. Examples include composite oxides of a metal such as cobalt, manganese, nickel, or a combination thereof, and lithium may be used. In one embodiment, the compounds represented by one of the following Chemical Formulae may be used: $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$, (0.90≤a<1.8, 0≤b≤0.5, 0≤c≤0.5, 0<α≤2); $Li_aNi_{1-b-c}Co_bX_cO_{2-\alpha}T_\alpha$(0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$(0.90≤a≤1.8, 0≤b≤0.5, 0≤c≤0.05, 0<α≤2); $Li_aNi_{1-b-c}Mn_bX_cO_{2-\alpha}T_\alpha$(0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $Li_aFePO_4$(0.90≤a≤1.8)

In the above Chemical Formulae, A may be Ni, Co, Mn, or a combination thereof; X may be Al, Ni, Co, Mn, Cr, Fe, Mg, Sr, V, a rare earth element, or a combination thereof; D may be O, F, S, P, or a combination thereof; E may be Co, Mn, and a combination thereof; T may be F, S, P, or a combination thereof; G may be Al, Cr, Mn, Fe, Mg, La, Ce, Sr, V, or a combination thereof; Q may be Ti, Mo, Mn, and a combination thereof; Z may be Cr, V, Fe, Sc, Y, or a combination thereof; and J may be V, Cr, Mn, Co, Ni, Cu, or a combination thereof.

The compounds may have a coating layer on the surface or may be mixed with another compound having a coating layer. The coating layer may include at least one coating element compound of an oxide of a coating element, a hydroxide of a coating element, an oxyhydroxide of a coating element, an oxycarbonate of a coating element, and a hydroxyl carbonate of a coating element. The compound for the coating layer may be, for example, amorphous or crystalline. Examples of the coating element in the coating layer include Mg, Al, Co, K, Na, Ca, Si, Ti, V, Sn, Ge, Ga, B, As, Zr, or a mixture thereof. The coating layer may be disposed, for example, using a method having no adverse influence on properties of a positive active material using these elements in the compound. Examples of the method include spray coating, dipping, or another coating method.

In the positive electrode, the content of the positive active material may be, for example, about 90 wt % to about 98 wt % based on the total weight of the positive active material layer. In an embodiment, the positive active material layer may further include a binder and a conductive material. The binder and the conductive material may be included in an amount of, for example, about 1 wt % to about 5 wt %, respectively based on the total amount of the positive active material layer.

When the porous structured additive is further included in the positive active material layer, the content of the porous structured additive may range, for example, from 0.01 wt % to about 2 wt % based on the total weight of the positive active material layer. In addition, when the porous structured additive is included in the positive active material layer, the content of the positive active material may range, for example, from about 97.59 wt % to about 98 wt %. Each content of the binder and the conductive material may range, for example, from about 1.2 wt % to about 6 wt % based on the total weight of the positive active material layer.

The binder improves binding properties of positive active material particles with one another and with a current collector. Examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene butadiene rubber, an epoxy resin, and nylon.

The conductive material is included to provide electrode conductivity. Any electrically conductive material may be used as a conductive material unless it causes an adverse chemical change. Examples of the conductive material include a carbon-based material such as natural graphite, artificial graphite, carbon black, acetylene black, ketjen black, a carbon fiber and the like; a metal-based material of a metal powder or a metal fiber including copper, nickel, aluminum, silver, and the like; a conductive polymer such as a polyphenylene derivative; or a mixture thereof.

The current collector may use Al or another conductive material.

The electrolyte includes non-aqueous organic solvent and a lithium salt. The non-aqueous organic solvent serves as a medium for transmitting ions taking part in the electrochemical reaction of a battery. Examples of the non-aqueous organic solvent include a carbonate-based, ester-based, ether-based, ketone-based, alcohol-based, or aprotic solvent. The carbonate based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. The ketone-based solvent may include, for example, cyclohexanone. The alcohol-based solvent include, for example, ethyl alcohol or isopropyl alcohol. Examples of the aprotic solvent include nitriles such as R—CN (where R is a C2 to C20 linear, branched, or cyclic hydrocarbon, a double bond, an aromatic ring, or an ether bond), and amides as dimethylformamide, dioxolanes such as 1,3-dioxolane, sulfolanes.

The organic solvent may be used alone or in a mixture. When the organic solvent is used in a mixture, the mixture ratio may be controlled in accordance with a desirable battery performance.

The carbonate-based solvent may include a mixture with, for example, a cyclic carbonate and a linear carbonate. The cyclic carbonate and linear carbonate are mixed together, for example, in a volume ratio of about 1:1 to about 1:9. When the mixture is used as an electrolyte, enhanced performance may be realized.

The organic solvent may further include, for example, an aromatic hydrocarbon-based solvent as well as the carbonate-based solvent. The carbonate-based solvent and aromatic hydrocarbon-based solvent may be mixed together in a volume ratio of about 1:1 to about 30:1. The aromatic hydrocarbon-based organic solvent may be an aromatic hydrocarbon-based compound represented by Chemical Formula 1.

Chemical Formula 1

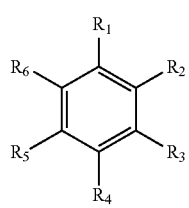

where $R_1$ to $R_6$ are the same or different and, for example, may be at least one of hydrogen, a halogen, a C1 to C10 alkyl group, a haloalkyl group, or a combination thereof.

Examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of, for example, vinylene carbonate, an ethylene carbonate-based compound represented by Chemical Formula 2, or propanesultone to improve a cycle life.

Chemical Formula 2

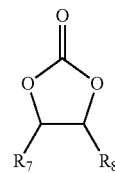

where $R_7$ and $R_8$ are the same or different and, for example, may be independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving cycle life may be flexibly used within an appropriate range.

The lithium salt dissolved in an organic solvent supplies the battery with lithium ions, basically operates the rechargeable lithium battery, and improves transportation of the lithium ions between positive and negative electrodes. Examples of the lithium salt include at least one supporting salt of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers (e.g., integers of 1 to 20), LiCl, LiI, and $LiB(C_2O_4)_2$ (lithium bis(oxalato) borate; LiBOB). The concentration of the lithium salt may range, for example, from about 0.1 M to about 2.0 M. When the lithium salt is included at the above concentration range, the electrolyte of the battery may have excellent performance and lithium ion mobility due to optimal electrolyte conductivity and viscosity.

The rechargeable lithium battery may further include a separator between the negative electrode and the positive electrode, depending, for example, on the kind of battery. Examples of the separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 6:
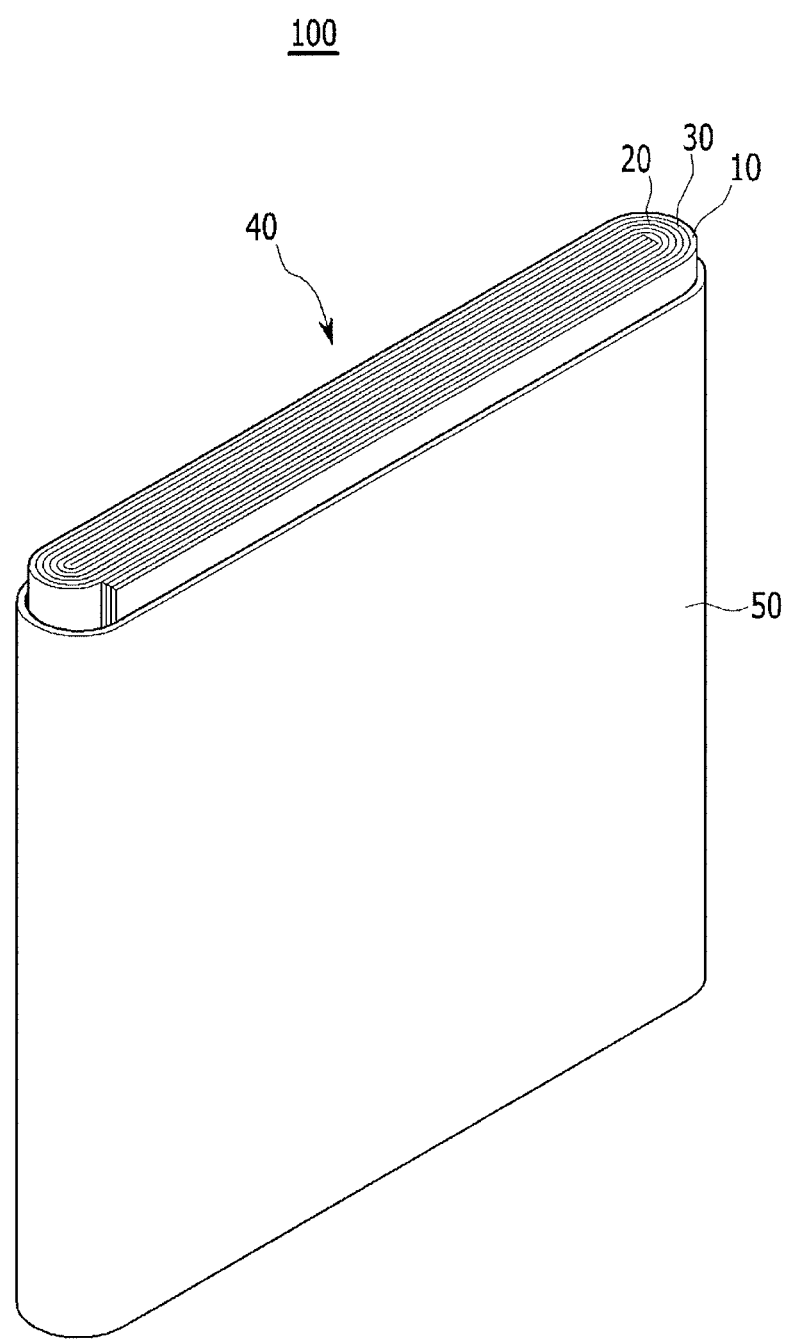
FIG. 6 illustrates an embodiment of a rechargeable lithium battery.

FIG. 6 illustrates an exploded perspective view of an embodiment of a rechargeable lithium battery 100. According to an embodiment, the rechargeable lithium battery 100 is illustrated as a prismatic battery, but may be a cylindrical battery, a pouch battery, or another type of battery or have another type of battery shape.

Referring to FIG. 6, a rechargeable lithium battery 100 according to an embodiment includes an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example Embodiment 1

In this example, 97.5 wt % of artificial graphite, 1.5 wt % of a styrene butadiene rubber, and 1 wt % of carboxylmethyl cellulose were mixed in a water solvent to prepare negative active material slurry. A Cu foil was disposed on a magnet. The negative active material slurry was coated on the Cu foil followed by drying and compressing the same to manufacture a negative electrode. The viscosity of the negative electrode slurry was about 2200 cps, the strength of the magnetic field was 4500 Gauss, and the magnetic field exposure time of the negative electrode slurry was 8 seconds.

Also, 97.7 wt % of $LiCoO_2$ positive active material, 0.2 wt % of activated carbon, 1.0 wt % of polyvinylidene fluoride, and 1.1 wt % of ketjen black were mixed in an N-methylpyrrolidone solvent to prepare positive active material slurry. The positive active material slurry was coated on an Al substrate, dried, and compressed to manufacture a positive electrode.

A rechargeable lithium battery was manufactured using the negative electrode, the positive electrode, and an electrolyte. The electrolyte was prepared using a mixed solvent of ethylene carbonate and diethyl carbonate (50:50 of a volume ratio) and dissolving 1 M $LiPF_6$ therein.

Example Embodiment 2

A positive electrode was manufactured according to the same method as Example Embodiment 1, except that porous anodized aluminum oxide was used instead of the activated carbon. A rechargeable lithium battery was manufactured using the positive electrode, the negative electrode of Example Embodiment 1 and the electrolyte of Example Embodiment 1.

Comparative Example 1

In this example, 97.5 wt % of artificial graphite, 1.5 wt % of a styrene butadiene rubber, and 1 wt % of carboxylmethyl cellulose were mixed in a water solvent to prepare negative active material slurry. The negative active material slurry was coated on a Cu foil, dried, and compressed to manufacture a negative electrode. Also, 97.7 wt % of a $LiCoO_2$ positive active material, 1.0 wt % of polyvinylidene fluoride, and 1.3 wt % of ketjen black were mixed in an N-methylpyrrolidone solvent to prepare positive active material slurry. The positive active material slurry was coated on an Al foil, dried, and compressed to manufacture a positive electrode.

A rechargeable lithium battery was manufactured using the negative electrode, the positive electrode, and an electrolyte. The electrolyte was prepared using a mixed solvent of ethylene carbonate and diethyl carbonate (50:50 of a volume ratio) and dissolving 1 M $LiPF_6$ therein.

Comparative Example 2

A rechargeable lithium battery was manufactured using the negative electrode of Example Embodiment 1, the positive electrode of Comparative Example 1, and the electrolyte of Comparative Example 1.

Comparative Example 3

In this example, 97.5 wt % of artificial graphite, 1.5 wt % of a styrene butadiene rubber, and 1 wt % of carboxylmethyl cellulose were mixed in a water solvent to prepare negative active material slurry. A Cu foil was disposed on a magnet. The negative active material slurry was coated on the Cu foil followed by drying and compressing the same to manufacture a negative electrode. The viscosity of the negative electrode slurry was about 2000 cps, the strength of the magnetic field was 5000 Gauss, and the magnetic field exposure time of the negative electrode slurry was 8 seconds.

A rechargeable lithium battery was manufactured using the negative electrode, the positive electrode of Comparative Example 1, and the electrolyte of Comparative Example 1.

Comparative Example 4

In this example, 97.5 wt % of artificial graphite, 1.5 wt % of a styrene butadiene rubber, and 1 wt % of carboxylmethyl cellulose were mixed in a water solvent to prepare negative active material slurry. A Cu foil was disposed on a magnet. The negative active material slurry was coated on the Cu foil followed by drying and compressing the same to manufacture a negative electrode. The viscosity of the negative electrode slurry was about 2700 cps, the strength of the magnetic field was 5000 Gauss, and the magnetic field exposure time of the negative electrode slurry was 1.5 seconds.

A rechargeable lithium battery was manufactured using the negative electrode, the positive electrode of Comparative Example 1, and the electrolyte of Comparative Example 1.

Comparative Example 5

In this example, 97.5 wt % of artificial graphite, 1.5 wt % of a styrene butadiene rubber, and 1.0 wt % of carboxylmethyl cellulose were mixed in a water solvent to prepare negative active material slurry. The negative active material slurry was coated on a Cu foil, dried, and compressed to manufacture a negative electrode. Also, 97.7 wt % of $LiCoO_2$ positive active material, 0.2 wt % of activated carbon, 1.0 wt % of polyvinylidene fluoride, and 1.1 wt % of ketjen black were mixed in an N-methylpyrrolidone solvent to prepare positive active material slurry. The positive active material slurry was coated on an Al substrate, dried, and compressed to manufacture a positive electrode.

A rechargeable lithium battery was manufactured using the negative electrode, the positive electrode, and an electrolyte. The electrolyte was prepared using a mixed solvent of ethylene carbonate and diethyl carbonate (50:50 of a volume ratio) and dissolving 1 M LiPF$_6$ therein.

Example Embodiment 3

In this example, 97.7 wt % of a LiCoO$_2$ positive active material, 0.25 wt % of activated carbon, 1.0 wt % of polyvinylidene fluoride, and 1.05 wt % of ketjen black were mixed in an N-methylpyrrolidone solvent to prepare positive active material slurry, and a positive electrode was manufactured using the positive active material slurry. A rechargeable lithium battery cell was manufactured using the positive electrode, the negative electrode of Example Embodiment 1 and the electrolyte of Example Embodiment 1.

Example Embodiment 4

In this example, 97.7 wt % of a LiCoO$_2$ positive active material, 1.25 wt % of activated carbon, 1.0 wt % of polyvinylidene fluoride, and 1.05 wt % of ketjen black were mixed in an N-methylpyrrolidone solvent to prepare positive active material slurry, and a positive electrode was manufactured using the positive active material slurry. A rechargeable lithium battery cell was manufactured using the positive electrode, the negative electrode of Example Embodiment 1 and the electrolyte of Example Embodiment 1.

Measurement of BET Specific Surface Area

The rechargeable lithium battery cells according to Example Embodiments 3 and 4 and Comparative Example 5 were charged and discharged at 0.1 C, completely discharged to 3 V and then disassembled to obtain positive electrodes. The positive electrodes were respectively used to obtain a plurality of 5 cm×5 cm size samples. The samples were respectively cut into the size of 0.5 cm×0.5 cm, put in a BET sample holder, and then their BET's were measured in a nitrogen gas adsorption method. The results are shown in Table 1.

TABLE 1

| | BET(m$^2$/g) |
|---|---|
| Example Embodiment 3 | 0.7 |
| Example Embodiment 4 | 4.7 |
| Comparative Example 5 | 0.5 |

As shown in Table 1, the BET specific surface areas of Example Embodiments 3 and 4 were greater than or equal to 0.70 m$^2$/g, but that of Comparative Example 5 was less than 0.70 m$^2$/g. From these results, the positive electrodes according to Example Embodiments 3 and 4 are expected to have improved lithium ion conductivity.

Measurement of X-Ray Diffraction Characteristics

The rechargeable lithium battery cells according to Example Embodiment 1, Comparative Example 3, and Comparative Example 4 were charged and discharged twice at 0.1 C and then completely discharged. The completely-discharged battery cells were disassembled to obtain negative electrodes. As for these negative electrodes, an X'Pert (PANalytical B.V.) XRD equipment using a CuKα ray as a target ray was used, but a monochromator equipment was removed in order to improve a peak intensity resolution. The measurement was performed under a condition of 2θ=10° to 80°, a scan rate (°/S)=0.06436, and a step size of 0.026°/step.

From the measured XRD results, the area sum of peaks shown at 2θ=42.4±0.2° ((100) plane), 43.4±0.2° ((101)R plane), 44.6±0.2° ((101)H plane), and 77.5±0.2° ((110) plane) as 1, the area sum of peaks shown at 2θ=26.5±0.2° ((002) plane), 42.4±0.2° ((100) plane), 43.4±0.2° ((101)R plane), 44.6±0.2° ((101)H plane), 54.7±0.2° ((004) plane), and 77.5±0.2° ((110) plane) as I$_{total}$ are shown in Table 1. From these values, DD (I$_{total}$/I$_a$) values were calculated and are shown in Table 1. In particular, peaks corresponding to a (101)R plane of graphite and a (111) plane of a Cu current collector at 43.4±0.2° overlapped. In addition, I$_{(110)}$/I$_{(004)}$ was calculated as shown in Table 2.

TABLE 2

| | Peak Integral Area | | |
|---|---|---|---|
| | Example 1 | Comparative Example 3 | Comparative Example 4 |
| I$_{total}$ | 85094.19 | 79275.2 | 52915.2 |
| I$_a$ | 34865.44 | 32899.49 | 9536.3 |
| DD | 40.9 | 41.5 | 18.02 |
| I$_{(110)}$/I$_{(004)}$ | 0.38 | 0.5 | 0.396321 |

As shown in Table 2, DD value of the negative electrode of Example Embodiment 1 is 40.9, while that of Comparative Example 3 is 41.5. The I$_{(110)}$/I$_{(004)}$ of Example Embodiment 1 is 0.38, while that of Comparative Example 3 is 0.5. In addition, the I$_{(110)}$/I$_{(004)}$ of Comparative Example 4 is about 0.4 and its DD is 18.02. From these results, it is confirmed that even if I$_{(110)}$/I$_{(004)}$ is similar, DD is not similar.

Measurement of Charge and Discharge Efficiency

Figure 7:
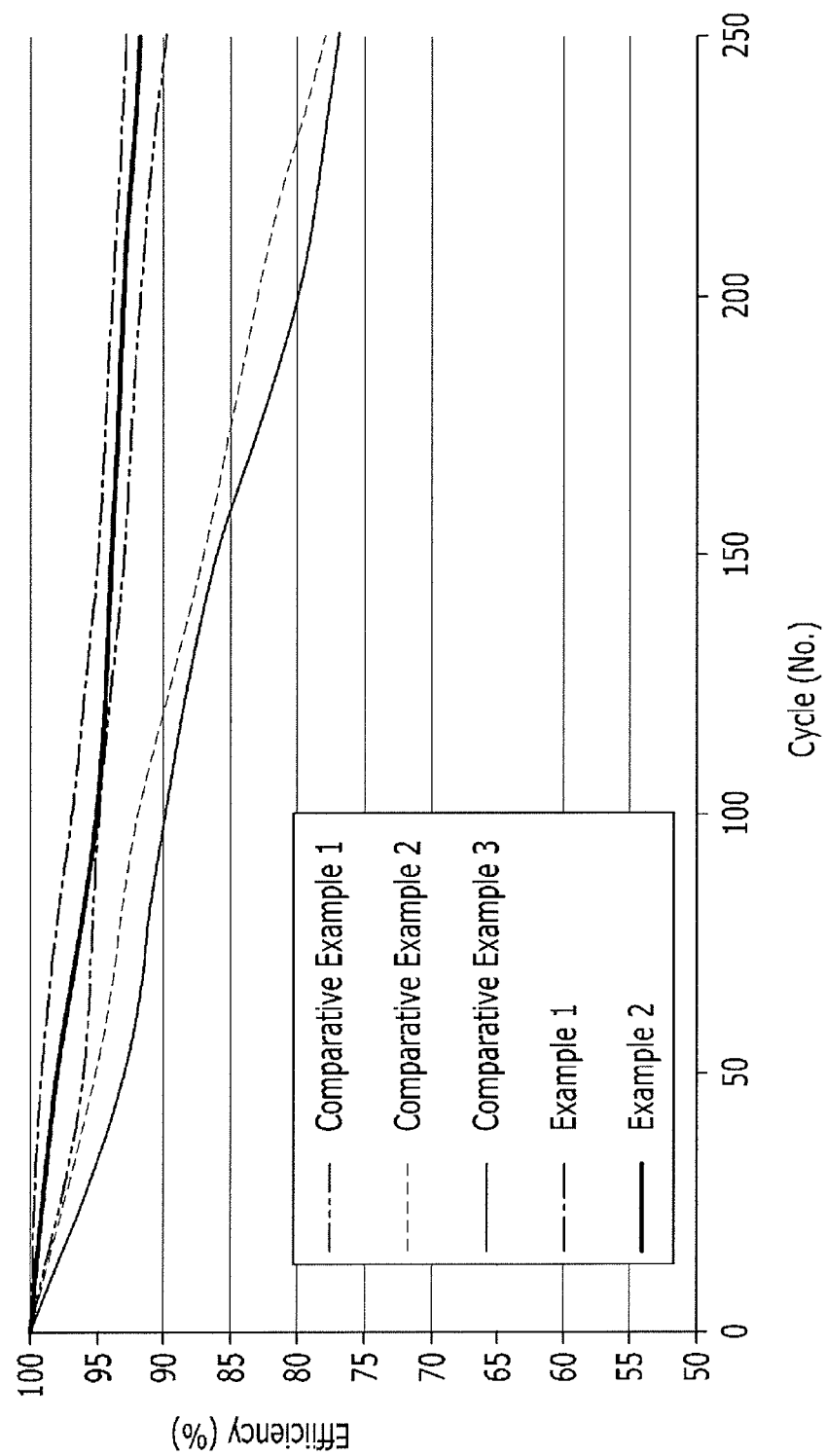
FIG. 7 illustrates Example Embodiments and Comparative Examples of charge and discharge efficiencies of rechargeable lithium battery cells.

The rechargeable lithium battery cells according to Example Embodiments 1 and 2 and Comparative Examples 1 to 3 were charged and discharged at 0.7 C 250 times. Percent (%) values at each cycle based on 100% of first cycle discharge capacity were obtained and the values were referred to efficiency %. The results are shown in FIG. 7. As shown in FIG. 7, charge and discharge efficiency of Example Embodiments 1 and 2 were significantly compared with Comparative Examples 2 and 3.

Measurement of DC Internal Resistance (DC-IR: Direct Current Internal Resistance)

The rechargeable lithium battery cells according to Example Embodiments 1 and 2 and Comparative Examples 1, 2, and 5 were evaluated under a 0.1 C charge and discharge condition. Their discharge capacity was first confirmed and regarded as a 1 C reference. Then, DC internal resistance (DC-IR) was evaluated by 0.025 C cut-off, charging the battery cells at 0.7 C under CCCV (constant current/constant voltage), discharging the battery cells at 0.1 C, and measuring a voltage drop (V) while current flew at 1 C for 1 second under various SOC conditions. The SOC conditions were SOC70 (charged to be 70% of charge capacity based on 100% of entire battery charge capacity, which is 30% discharged in a discharge state), SOC20 (charged to be 20% of charge capacity based on 100% of entire battery charge capacity, which is 80% discharged in a discharge state), and SOC10 (charged to be 10% of charge capacity based on 100% of entire battery charge capacity, which is 90% discharged in a discharge state).

Figure 8:
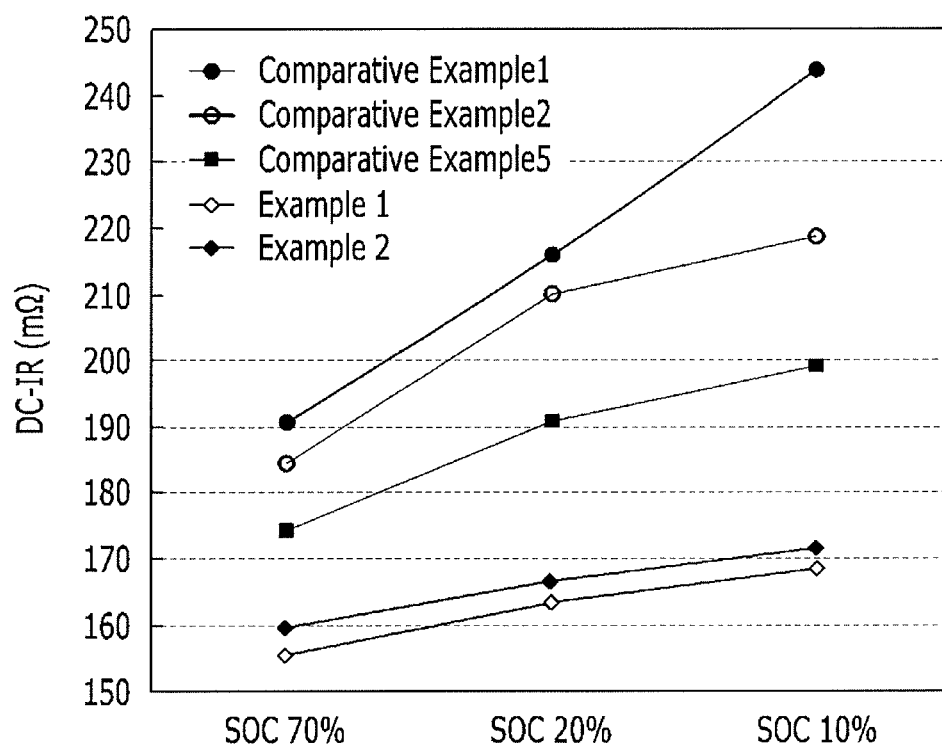
FIG. 8 illustrates Example Embodiments and Comparative Examples of DC internal resistance of rechargeable lithium battery cells after charging and discharging operations under various SOC conditions.

The results are shown in FIG. 8. As shown in FIG. 8, the rechargeable lithium battery cells according to Example Embodiments 1 and 2 showed low DC internal resistance in all SOC conditions, compared with the rechargeable lithium battery cells according to Comparative Examples 1, 2, and 5. These results show that the concentration overvoltage of the positive electrode was improved when the porous structured additive was used in the positive electrode.

Example Embodiment 5

In this example, 97.5 wt % of artificial graphite, 1.5 wt % of a styrene butadiene rubber, and 1 wt % of carboxylmethyl cellulose were mixed in a water solvent to prepare negative active material slurry. A Cu foil was disposed on a magnet. The negative active material slurry was coated on the Cu foil followed by drying and compressing the same to manufacture a negative electrode. The viscosity of the negative electrode slurry was about 2200 cps, the strength of the magnetic field was 4500 Gauss, and the magnetic field exposure time of the negative electrode slurry was 8 seconds. Also, 50 wt % of activated carbon and 50 wt % of N-methyl pyrrolidone were mixed to prepare a porous additive liquid.

The porous additive liquid was coated on an Al foil to have a porous layer having porosity of 30% and a thickness of 2 μm. Also, 97.7 wt % of a LiCoO₂ positive active material, 1.0 wt % of polyvinylidene fluoride, and 1.3 wt % of ketjen black were mixed in an N-methylpyrrolidone solvent to prepare positive active material slurry. The positive active material slurry was coated on the porous layer, dried, and compressed to manufacture a positive electrode.

A rechargeable lithium battery was manufactured using the negative electrode, the positive electrode, and an electrolyte. The electrolyte was prepared using a mixed solvent of ethylene carbonate and diethyl carbonate (50:50 of a volume ratio) and dissolving 1 M LiPF₆ therein.

Comparative Example 6

In this example, 97.5 wt % of artificial graphite, 1.5 wt % of a styrene butadiene rubber, and 1 wt % of carboxylmethyl cellulose were mixed in a water solvent to prepare negative active material slurry. A Cu foil was disposed on a magnet. The negative active material slurry was coated on the Cu foil followed by drying and compressing the same to manufacture a negative electrode. The viscosity of the negative electrode slurry was about 2200 cps, the strength of the magnetic field was 4500 Gauss, and the magnetic field exposure time of the negative electrode slurry was 8 seconds.

Also, 97.7 wt % of a LiCoO₂ positive active material, 1.0 wt % of polyvinylidene fluoride, and 1.3 wt % of ketjen black were mixed in an N-methylpyrrolidone solvent to prepare positive active material slurry. The positive active material slurry was coated on an Al substrate, dried, and compressed to manufacture a positive electrode.

A rechargeable lithium battery was manufactured using the negative electrode, the positive electrode, and an electrolyte. The electrolyte was prepared using a mixed solvent of ethylene carbonate and diethyl carbonate (50:50 of a volume ratio) and dissolving 1 M LiPF₆ therein.

DC-IR Measurement

The rechargeable lithium battery cells according to Example Embodiment 5 and

Comparative Example 6 were evaluated under a 0.1 C charge and discharge condition. Their discharge capacities were first confirmed and regarded as a 1 C reference. Then, DC internal resistance (DC-IR) was evaluated by 0.025 C cut-off charging the battery cells at 0.7 C under CCCV (constant current/constant voltage) and discharging the battery cells at 0.1 C and measuring a voltage drop (V) while a current flew at 1 C for 1 second under various SOC conditions. The SOC conditions were SOC70 (charged to be 70% of charge capacity based on 100% of entire battery charge capacity, which is 30% discharged in a discharge state), SOC20 (charged to be 20% of charge capacity based on 100% of entire battery charge capacity, which is 80% discharged in a discharge state), and SOC10 (charged to be 10% of charge capacity based on 100% of entire battery charge capacity, which is 90% discharged in a discharge state).

Figure 9:
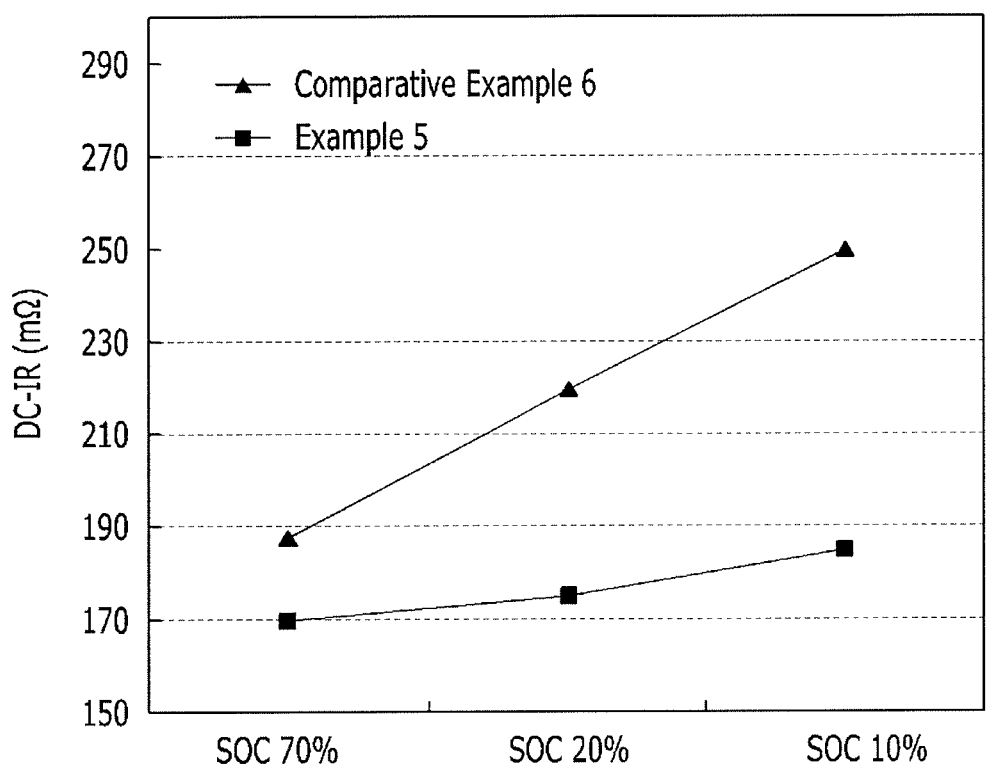
FIG. 9 illustrates another Example Embodiment and another Comparative Example of DC internal resistance of rechargeable lithium battery cells after charging and discharging operations under various SOC conditions.

The results are shown in FIG. 9. As shown in FIG. 9, the rechargeable lithium battery cell according to Example Embodiment 5 showed low DC internal resistance in all SOC conditions, compared with the rechargeable lithium battery cell according to Comparative Example 6. These results show that the concentration overvoltage in the positive electrode was improved when the porous layer including the porous structured additive was formed between the positive current collector and the active material layer.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A rechargeable lithium battery, comprising:
an electrolyte;
a negative electrode comprising a negative active material layer on a negative current collector and the negative active material layer comprising a carbon-based negative active material, the negative electrode having a Degree of Divergence (DD) value of about 19 to about 41, the DD value defined by the following equation:

$$DD=(I_a/I_{total})*100$$

where $I_a$ is a sum of peak intensities at $2\theta=42.4\pm0.2°$, $43.4\pm0.2°$, $44.6\pm0.2°$, and $77.5\pm0.2°$ measured by XRD using a CuKα ray and $I_{total}$ is a sum of peak intensities at $2\theta=26.5\pm0.2°$, $42.4\pm0.2°$, $43.4\pm0.2°$, $44.6\pm0.2°$, $54.7\pm0.2°$, and $77.5\pm0.2°$ measured by XRD using a CuKα ray; and a positive electrode including a positive active material layer on a positive current collector and including a positive active material and a porous structured additive, wherein a content of the porous structured additive is 0.01 wt % to less than 0.5 wt % based on 100 wt % of the positive active material layer.

2. The rechargeable lithium battery as claimed in claim 1, wherein the porous structured additive is a carbon-based porous material, an oxide-based porous material, a carbon-coated oxide-based porous material, or a combination thereof.

3. The rechargeable lithium battery as claimed in claim 1, wherein the porous structured additive is activated carbon, porous anodized aluminum oxide, or a combination thereof.

4. The rechargeable lithium battery as claimed in claim 1, wherein the peak intensities are a peak integral area value.

5. The rechargeable lithium battery as claimed in claim 1, wherein the carbon-based negative active material is artificial graphite or a mixture of artificial graphite and natural graphite.

6. The rechargeable lithium battery as claimed in claim 1, wherein the negative active material layer includes a Si-based negative active material, a Sn-based negative active material, a lithium vanadium oxide, or a combination thereof.

7. The rechargeable lithium battery as claimed in claim 1, wherein a BET specific surface area of the positive electrode is greater than about 0.70 m$^2$/g.

8. The rechargeable lithium battery as claimed in claim 1, wherein the negative active material layer is formed from a composition having a viscosity of about 2000 cps to about 4000 cps at about 20° C. to about 25° C.

9. A rechargeable lithium battery, comprising:
an electrolyte;
a negative electrode comprising a negative active material layer on a negative current collector and the negative active material layer comprising a carbon-based negative active material, wherein the negative electrode has a Degree of Divergence (DD) value of about 19 to about 41, the DD value defined by the following equation:

$$DD\ value=(I_a/I_{total})*100$$

where $I_a$ is a sum of peak intensities at 2θ=42.4±0.2°, 43.4±0.2°, 44.6±0.2°, and 77.5±0.2° measured by XRD using a CuKα ray and $I_{total}$ is a sum of peak intensities at 2θ=26.5±0.2°, 42.4±0.2°, 43.4±0.2°, 44.6±0.2°, 54.7±0.2°, and 77.5±0.2° measured by XRD using a CuKα ray; and
a positive electrode including a positive current collector and a positive active material layer including a positive active material, a porous layer between the positive current collector and the positive active material layer and including a porous structured additive in an amount of 0.01 wt % to less than 0.5 wt % based on 100 wt % of the positive active material layer.

10. The rechargeable lithium battery as claimed in claim 9, wherein a thickness of the porous layer ranges from about 0.5 μm to about 10 μm.

11. The rechargeable lithium battery as claimed in claim 9, wherein the porous structured additive is a carbon-based porous material, an oxide-based porous material, a carbon-coated oxide-based porous material, or a combination thereof.

12. The rechargeable lithium battery as claimed in claim 9, wherein the porous structured additive is activated carbon, porous anodized aluminum oxide, or combination thereof.

13. The rechargeable lithium battery as claimed in claim 9, wherein the peak intensities are a peak integral area value.

14. The rechargeable lithium battery as claimed in claim 9, wherein the carbon-based negative active material is artificial graphite or a mixture of artificial graphite and natural graphite.

15. The rechargeable lithium battery as claimed in claim 9, wherein the negative active material layer includes a Si-based negative active material, a Sn-based negative active material, a lithium vanadium oxide, or a combination thereof.

16. The rechargeable lithium battery as claimed in claim 9, wherein a BET specific surface area of the positive electrode is greater than or equal to about 0.70 m$^2$/g.

17. The rechargeable lithium battery as claimed in claim 9, wherein the negative active material layer is formed from a composition having a viscosity of about 2000 cps to about 4000 cps at about 20° C. to about 25° C.

* * * * *